United States Patent
Preisler et al.

(10) Patent No.: US 9,296,354 B1
(45) Date of Patent: Mar. 29, 2016

(54) AIRBAG COVER ASSEMBLY INCLUDING LAYERED, DECORATIVE COVER PIECES HELD TOGETHER AT A DECORATIVE SEAM

(71) Applicant: Global IP Holdings, LLC, Sterling Heights, MI (US)

(72) Inventors: Darius J. Preisler, Macomb, MI (US); Joseph C. Frank, Shelby, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 0 days.

(21) Appl. No.: 14/619,159

(22) Filed: Feb. 11, 2015

(51) Int. Cl.
*B60R 21/215* (2011.01)
*B60R 21/2165* (2011.01)

(52) U.S. Cl.
CPC ........... *B60R 21/215* (2013.01); *B60R 21/2165* (2013.01)

(58) Field of Classification Search
CPC .......................... B60R 21/215; B60R 21/2165
See application file for complete search history.

(56) References Cited

U.S. PATENT DOCUMENTS

| | | | |
|---|---|---|---|
| 5,335,935 A | 8/1994 | Proos et al. | |
| 5,449,197 A | 9/1995 | Kerner | |
| 5,611,564 A | 3/1997 | Bauer | |
| 5,855,391 A | 1/1999 | Holland | |
| 5,957,483 A | 9/1999 | Miltenberger et al. | |
| 6,206,410 B1 * | 3/2001 | Brown | B60R 21/207 280/728.3 |
| 6,237,934 B1 * | 5/2001 | Harrell | B60R 21/207 280/728.3 |
| 6,328,367 B1 | 12/2001 | Eichhorn et al. | |
| 6,428,738 B1 | 8/2002 | Winget et al. | |
| 6,443,484 B2 | 9/2002 | Anglsperger | |
| 6,682,091 B1 | 1/2004 | Mitrowitz et al. | |
| 6,837,515 B2 | 1/2005 | Yaldir | |
| 7,029,025 B2 | 4/2006 | Schwark et al. | |
| 7,323,131 B2 | 1/2008 | Lutze et al. | |
| 7,380,814 B2 | 6/2008 | Preisler | |
| 7,625,004 B2 | 12/2009 | Geltinger et al. | |
| 7,631,890 B1 | 12/2009 | Kalisz et al. | |
| 7,810,836 B2 | 10/2010 | Muller et al. | |
| 7,918,481 B2 | 4/2011 | Ohgo et al. | |
| 7,938,437 B2 | 5/2011 | Lippert et al. | |
| 7,967,328 B2 | 6/2011 | Wieczorek et al. | |
| 8,171,868 B2 | 5/2012 | Evans et al. | |
| 8,210,567 B2 | 7/2012 | Wieczorek et al. | |
| 8,496,264 B2 | 7/2013 | Sauer et al. | |
| 8,517,416 B2 | 8/2013 | Lesnik | |
| 8,523,220 B1 | 9/2013 | Gehret et al. | |
| 8,651,514 B2 | 2/2014 | Zhang | |
| 2001/0019200 A1 | 9/2001 | Hehl | |
| 2004/0164531 A1 | 8/2004 | Riha et al. | |

(Continued)

*Primary Examiner* — Drew Brown
(74) *Attorney, Agent, or Firm* — Brooks Kushman P.C.

(57) ABSTRACT

An airbag cover assembly including layered, decorative cover pieces held together at a decorative seam is provided. The assembly includes a plastic structural carrier having a tear seam and a pair of leather cover pieces overlying the outer surface of the carrier to form a covered front panel and at least one covered deployment door configured to enclose a non-inflated airbag. The tear seam forms a substantially weakened area of the carrier adjacent the at least one door. Apposed peripheral edges of the cover pieces are folded under and are adjacent one another to form the decorative seam which is adjacent to and aligned with the structurally weakened area. Stitches hold the cover pieces together at the decorative seam. The stitches burst in a controlled fashion during high-pressure impact during airbag deployment through the weakened area and through the decorative seam at the folded-under edges of the cover pieces.

30 Claims, 3 Drawing Sheets

(56) References Cited

U.S. PATENT DOCUMENTS

| | | | | |
|---|---|---|---|---|
| 2004/0227335 A1* | 11/2004 | Acker | | B60N 2/5841 280/730.2 |
| 2005/0029777 A1* | 2/2005 | Fleiner | | B60R 21/2165 280/728.1 |
| 2005/0081770 A1* | 4/2005 | Murley | | B60N 2/58 112/475.06 |
| 2006/0113763 A1* | 6/2006 | Tracht | | B60R 21/207 280/730.2 |
| 2006/0113764 A1* | 6/2006 | Tracht | | B60R 21/207 280/730.2 |
| 2006/0113765 A1* | 6/2006 | Tracht | | B60R 21/207 280/730.2 |
| 2006/0113768 A1* | 6/2006 | Tracht | | B60R 21/207 280/730.2 |
| 2008/0018082 A1* | 1/2008 | Wieczorek | | B60R 21/207 280/728.3 |
| 2009/0001784 A1* | 1/2009 | Wieczorek | | B60R 21/207 297/216.1 |
| 2009/0267329 A1 | 10/2009 | Kalisz et al. | | |
| 2009/0283993 A1 | 11/2009 | Finch et al. | | |
| 2011/0101653 A1 | 5/2011 | Rick et al. | | |
| 2012/0237712 A1 | 9/2012 | Thielhorn | | |
| 2014/0021703 A1 | 1/2014 | Scharf et al. | | |
| 2014/0042767 A1 | 2/2014 | Filipp | | |

* cited by examiner

AIRBAG COVER ASSEMBLY INCLUDING LAYERED, DECORATIVE COVER PIECES HELD TOGETHER AT A DECORATIVE SEAM

TECHNICAL FIELD

This invention generally relates to airbag cover assemblies and, in particular, to airbag cover assemblies having layered, decorative cover pieces such as leather cover pieces.

OVERVIEW

As described in U.S. Pat. No. 5,335,935, the advent of supplemental occupant restraint systems for vehicles, better known as airbags, has required covers within the vehicle interior to house the airbag until needed. These covers must properly release the airbag into position in the vehicle when inflated upon sudden deceleration of the vehicle. Use of such covers has required efforts to properly match the covers to the vehicle interior décor and trim materials. In many vehicles, leather is used to cover portions of the instrument panel, seats, door panels, and steering wheel and post and it is desirable to incorporate leather on airbag covers incorporated in such vehicles. However, difficulties have arisen in attempting to use leather on airbag covers.

First, natural leather is a nonuniform material whose thickness, rear strength and surface finish vary over a wide range. Attempts have been made to glue or otherwise adhere pieces of leather over molded or other preformed airbag covers. However, release of the airbags using such covers has been unsatisfactory because the strength of the covering leather often prevents proper opening of the cover to release the bag. Difficulties have also arisen in obtaining proper adhesion of the leather to the preformed cover. The leather will loosen and/or peel away from the underlying part over time. Other attempts have incorporated leather sheets sewn or otherwise made from multiple leather pieces. However, such products have required raised, sewn seams and have not provided the desired smooth finished leather look desired by vehicle manufacturers. Moreover, the labor intensive costs associated with producing such covers have been high, and it has often been difficult to properly align the seams in such fabricated leather sheets with a desired separation pattern for the airbag cover. This also restricts proper release of the airbag.

A concurrent problem in the use of leather covered, molded articles generally have been the inability to obtain a proper leather grain appearance on the exposed surface of the article. Manufacturing procedures in applying leather covers to preformed articles with adhesives and the like have often diminished the naturally appearing grain in the leather and provided an almost smooth appearance instead of the desired natural leather grain. In addition, it has been difficult with past procedures to properly adhere the leather to a preformed article such that the leather remains secured to the article for proper appearance over its life.

Yet another problem encountered with covers for vehicle airbags has been the difficulty in obtaining proper airbag release over the wide range of temperatures in which the typical vehicle is expected to operate. In many airbag covers, a separation line of reduced strength has been provided such that the cover will separate into flaps which bend back to provide an opening through which the bag is released. However, in subzero temperatures, when the covers are made from various resinous plastic materials, the tensile strength of the plastic is greatly reduced due to the brittleness of the plastic at such low temperatures. Thus, prior known molded plastic airbag covers have often fractured prematurely in extremely low temperatures, or have failed to properly release the airbag upon inflation in such temperatures.

U.S. Pat. No. 6,443,484 discloses a decorative layer for an airbag covering, especially for use in motor vehicles, with a local initiating area in the decorative layer, the tear for tearing through the decorative layer when the airbag is deployed being initiated in this area. The airbag covering includes a shaped part with predetermined break-lines and a decorative layer applied to the shaped part. At least one locally limited initiating area is provided in the decorative layer, the tear for tearing through the decorative layer when the airbag is deployed being initiated along the predetermined break-lines of the shaped part, in this area. The decorative covering may be made of leather, an artificial leather, or a plastic film of polyurethane, polyvinyl chloride, acrylonitrile acrylic ester, or acrylonitrile butadiene styrene.

U.S. Pat. No. 7,029,025 discloses a rupturable cover for an airbag module comprising an inner cover and an outer cover overlying the inner cover. The inner cover has a first tear seam for enabling rupturing of the inner cover in response to inflation of an airbag. The outer cover has a second tear seam for enabling rupturing of the outer cover. The second tear seam has a configuration different from the first tear seam. At least a portion of the second tear seam overlies the first tear seam when the outer cover is adhered to the inner cover in any one of a plurality of different positions of alignment. The second tear seam may have a wavy configuration.

As disclosed in U.S. Pat. No. 7,323,131, in modern high-quality motor vehicles, cushioned vehicle outfitting such as seat cushions, backrests, headrests, and armrests are covered with automobile leather (leather). Also, rigid interior trim parts in vehicles such as dashboard panels, consoles, steering wheel caps, sun visors, and interior trim on doors are made with a decorative leather layer facing the passenger compartment.

In order to apply the leather tightly over the edges of these parts of the vehicle interior (bend lines), or also so that it has a lower tear strength along a predetermined rupture line provided in the interior trim of the vehicle, e.g., in an airbag cover, the leather is weakened or severed along the desired bend line or predetermined rupture line and then sewed together again with functional thread. This functional thread is often undesirable for design reasons.

In practice, the leather is weakened by cutting or peeling with a knife from the underside.

Leather is a general term for tanned hides whose original fiber structure is retained substantially intact. Excluding splits or parts of the skin that were removed prior to tanning and are not used as automobile leather on principle, the leather comprises a grain layer, or top skin, and a dermis. Although it makes up only a fraction of the total thickness of the leather, the top skin substantially determines the tear strength.

Because of variations in thickness of the leather and the relatively small thickness of the top skin, the cutting depth when cutting by means of knives is selected in such a way that the top skin remains undamaged. This has the disadvantage that the tear strength of the leather is reduced only by about half even when the dermis is completely severed. Further, there is a wide variation in tear strength as a result of the natural variations in thickness of the undamaged top skin.

U.S. Pat. No. 7,323,131 discloses a method for producing an interior trim part in a vehicle having a decorative layer of leather, wherein the fiber structure of the leather is fixed by undercooling or by a fixing agent at least along a desired weakened line before the weakened line is produced by a laser and for the duration of the laser treatment. The leather comprises a dermis having an underside and a top skin having a decorative side. The weakened line is preferably formed by a series of perforations.

As described in U.S. Pat. No. 7,918,481, it is a complex matter to manage leathers having different thicknesses, strengths, and other characteristics in order to enhance the ability of the airbag cover to deploy in the leather-upholstered airbag cover. This patent discloses an airbag device in which a lid part over an opening formed in a base member opens in a suitable opening direction when the airbag is deployed. A tear seam is formed so as to extend along the axis line of a hinge shaft of the lid part in a region further to the outside than the opening. Detaching parts where a skin member on the base member detaches from the base member are provided to the outside region.

Other related U.S. patent documents include: U.S. Pat. Nos. 8,523,220; 8,517,416; 8,651,514; 8,210,567; 8,496,264; 8,171,868; 7,938,437; 7,810,836; 7,967,328; 7,625,004; 7,380,814; 6,837,515; 6,682,091; 6,428,738; 6,328,367; 5,957,483; 5,855,391; 5,611,564; 5,449,197; and 7,631,890; and U.S. published patent applications 2014/0042767; 2014/0021703; 2012/0237712; 2011/0101653; 2009/0283993; 2009/0267329; 2004/0164531; and 2001/0019200.

Finished or coated leather has a topical pigment coat applied. One of the most common coatings consists of a soft acrylic color coating under a urethane clear coating (for durability). These resins create a film or coating that bonds to the surface of the leather. Its primary goal is to protect the leather, providing wear, stain, and fade resistance.

Finished leather will resist staining by water- or oil-based agents (if a drop of water is put directly on the leather surface, the water bead remains in the surface, and does not soak in and darken the material). The clear coating mentioned above determines the final reflective value of the leather surface (ranging from high gloss, all the way down to a matte or dull finish, depending how much dulling agent is added to the clear coat resin before application), so sheen is not necessarily a help in determining leather type. Generally, finished leathers do not have that "buttery soft" leather feel (or hand) associated with raw leather. Also note, finished leathers can be described as aniline-dyed, and still have a topical pigment applied. Finished leathers are much less susceptible to fading.

Finished Leathers include:

Top-Grain: Top-grain leather has a pigmented resin coating to provide stain and wear resistance. Because these hides are generally free of major scarring or other unsightly characteristics, nothing is done to the epidermal layer. So, its natural grain pattern is evident.

Because all skin growth is from the inside outward, the most mature, tightly-woven, and most durable layer is the outer layer (the top-grain). They come in any color, and, thanks to special coloring effects, can simulate the look of more natural, organic appearance of unfinished leathers. The combination of a protective color coating and the natural durability of the hide's epidermal layer will afford long-term durability with minimal care. In a high-use environment, this is the type of leather that will offer the best performance over time.

Corrected Top-Grain: Corrected top-grain leather has its epidermis abraded (sanded) to remove significant scarring or other unsightly characteristics. This weakens the material, as the epidermis contains the most mature, structurally stable fibers. The hides will either be very smooth (no grain pattern), or have a grain pattern embossed onto them, and then are coated with a pigmented resin. Like top-grain leathers, corrected leathers can have print effects that make them more natural-looking.

The degree to which the epidermal layer has been compromised through sanding determines the long-term viability of corrected top-grain leather. It is the outer 1 millimeter of the hide that provides the most significant tensile strength. As one erodes that layer through sanding, and go deeper into the skin, one ends up with progressively weaker leather.

Splits: Split hides get their name from the process in which the top-grain (upper) section is cut away (split) from the suede (lower) section, rendering two separate hides from the initial one. As noted in the top-grain section, the vast majority of leather's strength is in the outer layer. Therefore, splits are a much weaker leather than top-grain, and will not stand-up well over time.

The inner layer of the top-grain hide is suede. The corresponding outer layer of a split is also suede. A resin coating may be placed over the split's top surface, laying down and encapsulating loose fibers, to create a smooth surface. Then, a synthetic grain pattern is stamped onto it, and finally, it is heavily coated with a pigmented resin to seal and color it. This leather may be hard, cold, and lacks durability.

Bi-Cast: Is a manufactured product made from either: 1) chopped up leather fibers mixed with an epoxy; or 2) a split hide. It is then coated with a heavy urethane film. The dominant strength of this product is the urethane coating, not the underlying "leather." This is a problematic material. It presents well, typically in a rich dark brown color, but has none of the durability or aesthetic characteristics of real leather.

Unfinished: The leather does not have a topical pigment applied, or has a minimal resin coating. The color is achieved by immersing hides in aniline dyes that are absorbed into the leather, accentuating the natural beauty of the hide. Because leather's absorption characteristics are not uniform, variations in color are common. The water drop test will result in the drop transferring into the leather, darkening or staining the area. Because unfinished leathers are colored using organic aniline dyes, they are much more susceptible to fading (caused by UV exposure).

In other words, unfinished leather is leather that has had little or no surface treatment added. When skin/hide is tanned, it starts out life as unfinished leather and simply takes its color from the aniline dyes added during the tanning process. During the finishing processes, the final stages of the tanning process, various finishes can be added to the surface to make it more serviceable or to hide defects and scars in the skins/hides surface.

Finished leather can either have a clear coat finish applied or a pigment coating and then a clear coat finish. These are often called pigment coated leather.

UV-Absorbent Pigments

Incorporation of pigments is probably the oldest way of providing protection against UV light. Titanium dioxide and carbon black are both capable of absorbing UV light and thus help to stabilize paint films. Pigments such as titanium dioxide can also cause photo-oxidative degradation of polymers. However, titanium dioxide is available in various forms, namely anatase (treated or untreated) and rutile (treated or untreated). Titanium dioxide can initiate polymer degradation, depending on the way it has been modified and treated, to form hydroxyl and hydroperoxide radicals.

Pigments can act as UV absorbers, but only under certain conditions.

UV Absorbers

The main function of UV absorbers is to absorb UV radiation in the presence of a chromophore (Ch) found in the polymer, the aim being to filter out the UV light that is harmful to the polymer before Ch* has had a chance of forming. Above all, a UV absorber must function within the 290 and 350 nm range. However, these data need to be modified to allow for possible impurities, which are unavoidable in industrially produced polymers, as well as additives, pigments, extender pigments or even dyes. Accordingly, the UV absorber should also be able to absorb light at higher wavelengths, without adversely affecting the color of the cured coating.

The purpose of UV absorbers is to absorb harmful UV light and quickly transform it into harmless heat. During this process, absorbed energy is converted into vibrational and rotational energy of the molecule constituents. For UV absorbers to be effective, it is important that this process takes place more rapidly than the corresponding reaction within the substrate, and that neither the UV absorber nor the polymer it is intended to stabilize are damaged during energy conversion. Some important UV absorbers are:

a) 2-(2-hydroxyphenyl)-benzotriazoles
    b) 2-hydroxy-benzophenones
    c) hydroxyphenyl-s-triazines
    d) oxalanilides Each of these UV absorber groups can be characterized by a typical absorption and transmission spectrum.

Extinction depends on wavelength and can be regarded as a measure of the stabilizing or screening effect of the UV absorber. In other words, the higher the extinction, the higher the UV light screening and the greater the stabilizing effect—assuming that the UV absorber is not itself destroyed by the absorption of the light. Extinction thus depends on the extinction coefficient, the concentration, "c", of the UV absorber in the polymer, and on the film thickness, "d", of the unpigmented polymers.

For a UV absorber to be effective, it must absorb UV light better and faster than the polymer it is meant to stabilize and dissipate the absorbed energy before unwelcome side reactions are triggered.

Despite the above U.S. patent documents, there still exists a need for a simplified yet effective airbag cover assembly including layered, decorative cover pieces held together at a decorative seam by stitching which busts during airbag deployment.

SUMMARY OF EXAMPLE EMBODIMENTS

An object of at least one embodiment of the present invention is to provide a simplified airbag cover assembly having layered, decorative cover pieces held together at a decorative seam by stitching which bursts during airbag deployment, thereby solving various design issues and accommodating various design directions and variations.

In carrying out the above object and other objects of at least one embodiment of the present invention, an airbag cover assembly including layered, decorative cover pieces held together at a decorative seam is provided. The assembly includes a plastic structural carrier having an inner surface, an outer surface and a tear seam. A pair of leather cover pieces overlay the outer surface of the carrier to form a covered front panel and at least one covered deployment door configured to enclose a non-inflated airbag. The tear seam forms as a substantially weakened area of the carrier adjacent to the at least one door. Apposed peripheral edges of the cover pieces are folded under and are adjacent to one another to form the decorative seam which is adjacent to and aligned with the structurally weakened area. Each of the cover pieces includes a layer of leather bonded to the outer surface of the carrier and a resin coating overlying and protecting the leather layer. Stitches hold the cover pieces together at the decorative seam. The stitches burst in a controlled fashion and the structurally weakened area tears during high-pressure impact during airbag deployment through the weakened area and through the decorative seam at the folded-under edges of the cover pieces.

The resin coatings of the cover pieces may be adjacent to one another to form the decorative seam and protect the peripheral edges of the cover pieces.

Each of the cover pieces may have a series of holes penetrating therethrough wherein the stitches penetrate the holes in a pattern.

Each pattern of holes may extend parallel and adjacent to the decorative seam.

Each series of holes may penetrate through the folded-under edge of one of the cover pieces.

The tear seam may be at least partially formed by a channel in the outer surface of the carrier, wherein the folded-under edges are disposed in the channel and wherein the folded-under edges at the decorative seam form a decorative wrinkle and protect the tear seam.

The wrinkle may be a straight-line wrinkle.

Each of the resin coatings may include a clear or light-colored resin layer.

Each of the resin coatings may include a pigmented resin layer overlying and protecting its leather layer wherein each light-colored or clear resin layer overlies and protects its pigmented resin layer.

Each of the resin coatings may include at least one anti-fading compound, at least one anti-soiling compound, and at least one water-repellant compound.

Each of the leather layers may be a natural or genuine leather layer.

The stitches may be thread stitches.

The airbag cover assembly may be a passenger-side, airbag cover assembly.

The structural carrier may be molded from a thermoplastic elastomeric material. The material may be TPO.

Further in carrying out the object and other objects of the at least one embodiment of the present invention, an airbag cover assembly including layered, decorative cover pieces held together at a decorative seam is provided. The assembly includes a plastic structural carrier having an inner surface, an outer surface and a tear seam. A pair of leather cover pieces overlay the outer surface of the carrier to form a covered front panel and a pair of covered deployment doors in close-spaced apposition with one another and configured to enclose a non-inflated airbag. The tear seam forms a substantially weakened area of the carrier adjacent to and between the doors. Apposed peripheral edges of the cover pieces are folded under and are adjacent to each one another to form the decorative seam which is adjacent to and aligned with the structurally weakened area. Each of the cover pieces include a layer of leather bonded to the outer surface of one of the doors and a resin coating overlying and protecting the leather layer. Stitches hold the cover pieces together at the decorative seam. The stitches burst in a controlled fashion and the structurally weakened area tears during high-pressure impact during airbag deployment through the weakened area and through the decorative seam at the folded-under edges of the cover pieces.

The resin coatings of the cover pieces may be adjacent to one another to form the decorative seam and protect the peripheral edges of the cover pieces.

Each of the cover pieces may have a series of holes penetrating therethrough wherein the stiches penetrate the holes in a pattern.

Each pattern of holes may extend parallel and adjacent to the decorative seam.

Each series of holes may penetrate through the folded-under edges of one of the cover pieces.

The tear seam may be at least partially formed by a channel in the outer surface of the carrier, wherein the folded-under edges are disposed in the channel and wherein the folded-under edges at the decorative seam form a decorative wrinkle.

The wrinkle may be a straight-line wrinkle.

Each of the resin coatings may include a clear or light-colored resin layer.

Each of the resin coatings may include a pigmented resin layer overlying and protecting its leather layer wherein each light-colored or clear resin layer overlies and protects its pigmented resin layer.

Each of the resin coatings may include at least one anti-fading compound, at least one anti-soiling compound, and at least one water-repellant compound.

Each of the leather layers may be a natural or genuine leather layer.

The stitches may be thread stitches.

The airbag cover assembly may be a passenger-side, airbag cover assembly.

The structural carrier may be molded from a thermoplastic elastomeric material such as TPO.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

Figure 1:
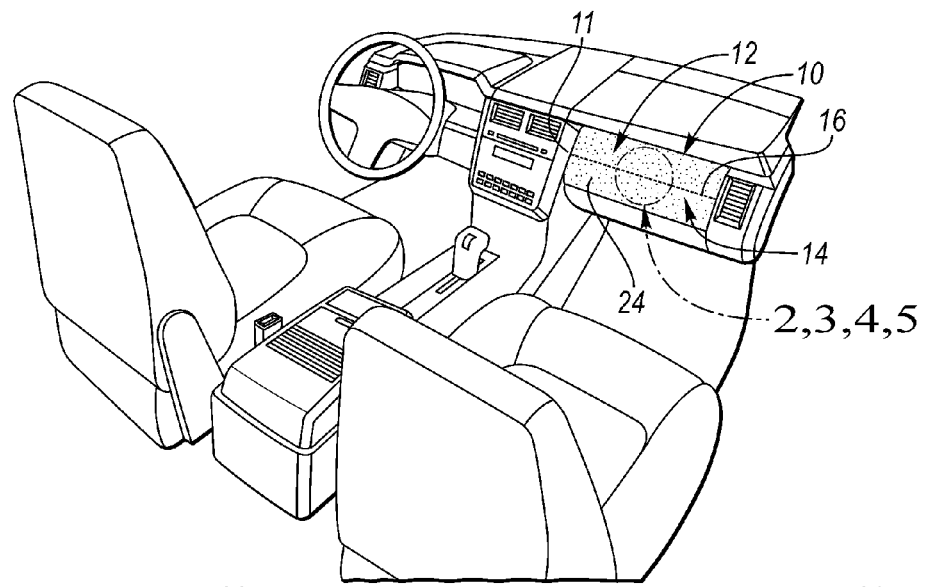
FIG. 1 is an environmental view showing an airbag cover assembly constructed in accordance with at least one embodiment of the present invention.
Figure 2:
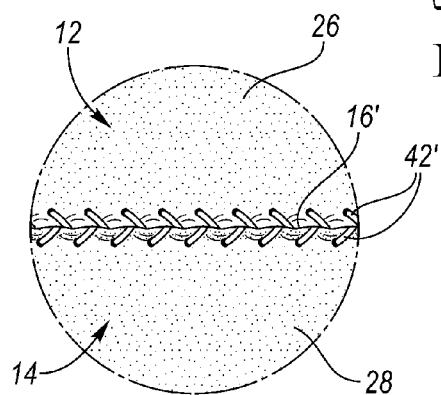
FIG. 2 is an enlarged view of a first possible stitching pattern within the circle of FIG. 1.
Figure 3:
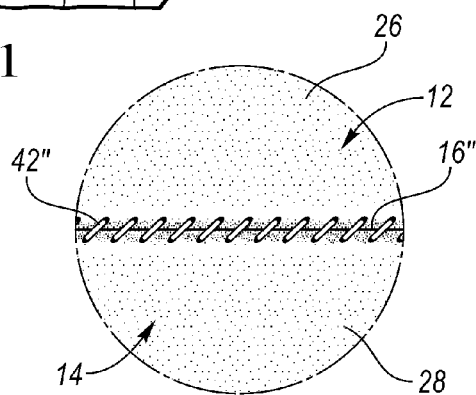
FIG. 3 is an enlarged view of a second possible stitching pattern within the circle of FIG. 1.
Figure 4:
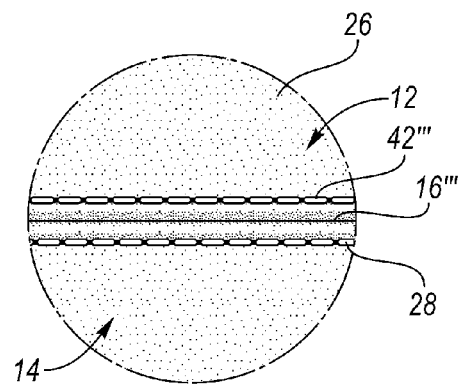
FIG. 4 is an enlarged view of a third possible stitching pattern within the circle of FIG. 1.
Figure 5:
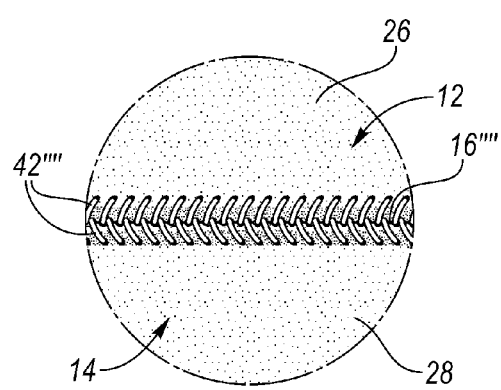
FIG. 5 is an enlarged view of a fourth possible stitching pattern within the circle of FIG. 1.
Figure 6:
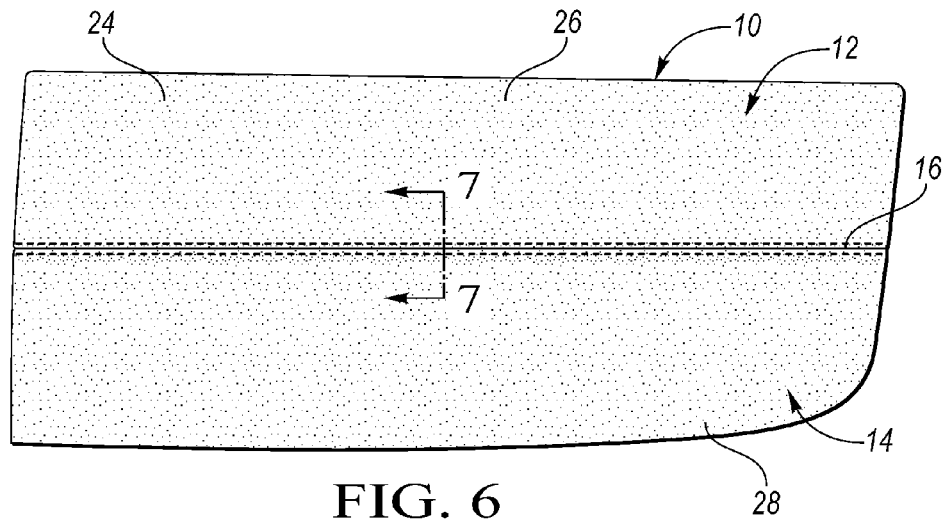
FIG. 6 is a front elevational view of the airbag cover assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "carrier" or "substrate" refers to any flexible, semi-flexible or rigid single or multi-layer component having a surface to which a decorative coating or cover piece is or can be applied by the methods described herein such as, without limitation, leather (real or synthetic) polymers and other plastics, as well as composite materials. Furthermore, the shape of the substrate and particularly the surface to be coated can be any part of an assembly or device manufactured by any of various methods, such as, without limitation, conventional molding, extruding, or otherwise fabricated. One preferred application contemplated herein is the covering of substrates that are automotive components such as automotive airbag covers.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent layers.

The term "anti-fading compound", as used herein, is intended to refer to any agent capable of providing at least minimal protection of a material from UV light, visible light, or both. Thus, the anti-fading compounds protect materials, and leather in particular, from damage caused by sunlight as well as incandescent light. Anti-fading compounds suitable for at least one embodiment of the invention include, without limitation, UV absorbers, UV blockers, UV inhibitors, light stabilizers, light inhibitors, HALS (Hindered Amine Light Stabilizers), antioxidants, and combinations thereof, known to be effective. Examples of suitable UV absorbers include, without limitation, substituted or unsubstituted compounds of benzophenones, benzotriazines, benzotriazoles, succinimides, aliphatic and aromatic dioic acids, benzoxyoxazin-ones, and polymers of various substituted or unsubstituted monomers, such as polypropylene, polyethylene, acrylic acids, or other alkyl, alkenyl, and aryl polymeric units. Many compounds in the above-described classes are also suitable antioxidants. Effective concentrations for the anti-fading agent, and for UV absorbers in particular, are generally in the range from about 0.01% to about 15% by weight of the composition. However, the concentration is not limited to this range. For example, for materials exposed to high light intensity, and particularly in areas of high sunlight, concentrations higher than 15% by weight may be useful.

The compositions may include at least one "anti-soiling compound." Examples of anti-soiling compounds include various polymeric compounds and other non-fluorocarbon compounds. Additional examples include fluorocarbons or fluorochemicals such as $C_1$-$C_{20}$ linear, branch, cyclic, and substituted or unsubstituted aliphatic hydrocarbons having one or more fluorine substitutions thereon. Many anti-soiling compounds are organic or hydrophobic in nature and are readily soluble in organic or hydrophobic carrying agents such as aliphatic petroleum napthas. Others may be more hydrophilic, having greater water solubility, and therefore be more suitable as a part of water-based or hydrophilic compositions of at least one embodiment of the present invention. The anti-soil compound may be added in a concentration ranging from about 0.01% to about 12% by weight of the composition. However, concentrations may be as high as 90% depending upon the concentration of other components and particular desired properties and applications of the composition.

In another aspect of the invention, at least one "water-repellant compound" or silicon-based polymer, such as a silane, may be added to the composition. Silanes, such as an organo-functional silane, are generally known for their hydrophobic properties and, therefore, generally impart water-repellent properties to the material. Accordingly, silanes may provide a barrier to water on the surface of the material, thereby making the material surfaces water-repellent. The silicon-based polymer may be included in various concentration ranges depending upon application and targeted use of the particular material. For example, a silane present in a concentration ranging from about 0.01% to about 25% by weight of the composition may be suitable for compositions whose applications are designed for interior as well as exterior material. However, silane concentrations higher than 25% may be desirable in compositions generally exposed to higher water content and/or moisture.

Referring now to the drawing figures, there is illustrated in FIG. 1, an airbag cover assembly, generally indicated at 10, adapted or configured to be mounted in an automotive instrument panel 11. The assembly 10 includes layered, decorative or leather cover pieces, generally indicated at 12 and 14, held together at a decorative seam 16. Different types of decorative seams are shown at 16', 16", 16''', and 16'''' in FIGS. 2-5, respectively. The assembly 10 includes a two-piece, plastic structural substrate or carrier, generally indicated at 18 in FIGS. 7 and 10, having an inner surface 20, an outer surface 22 and a membrane or tear seam 30.

The leather cover pieces 12 and 14 overlay the outer surface 22 of the carrier 18 to form a covered front panel 24 and a pair of covered deployment doors 26 and 28, in close-spaced apposition with one another and configured to enclose a non-inflated airbag (not shown). The tear seam 30 forms a substantially weakened area of the carrier 18 adjacent and between the doors 26 and 28. Apposed peripheral edges 32 and 34 of the cover pieces 12 and 14, respectively, are folded under and are adjacent to one another to form the decorative seam 16 adjacent to and aligned with the structurally weakened area 30. Each of the cover pieces 12 and 14 includes a layer 38 of leather bonded to the outer surface of one of the doors 26 and 28 by a layer 39 of adhesive and a resin coating, generally indicated at 40, overlying and protecting the leather layer 38.

Stitching or stitches 42 hold the cover pieces 12 and 14 together at the decorative seam 16. Different stitching patterns are shown at 42', 42", 42''', and 42'''' in FIGS. 2-5, respectively. The stitches 42 (or 42', 42", 42''', or 42'''') extending between the cover pieces 12 and 14 burst in a controlled fashion and the structurally weakened area 30 tears during high-pressure impact during airbag deployment through the weakened area 30 and through the decorative seam 16 (or 16', 16", 16''' or 16'''') at the folded-under edges 32 and 34 of the cover pieces 12 and 14.

The resin coatings 40 of the cover pieces 12 and 14 may be adjacent to one another to form the decorative seam 16 and protect the peripheral edges 32 and 34 of the cover pieces 12 and 14, respectively.

Figure 7:
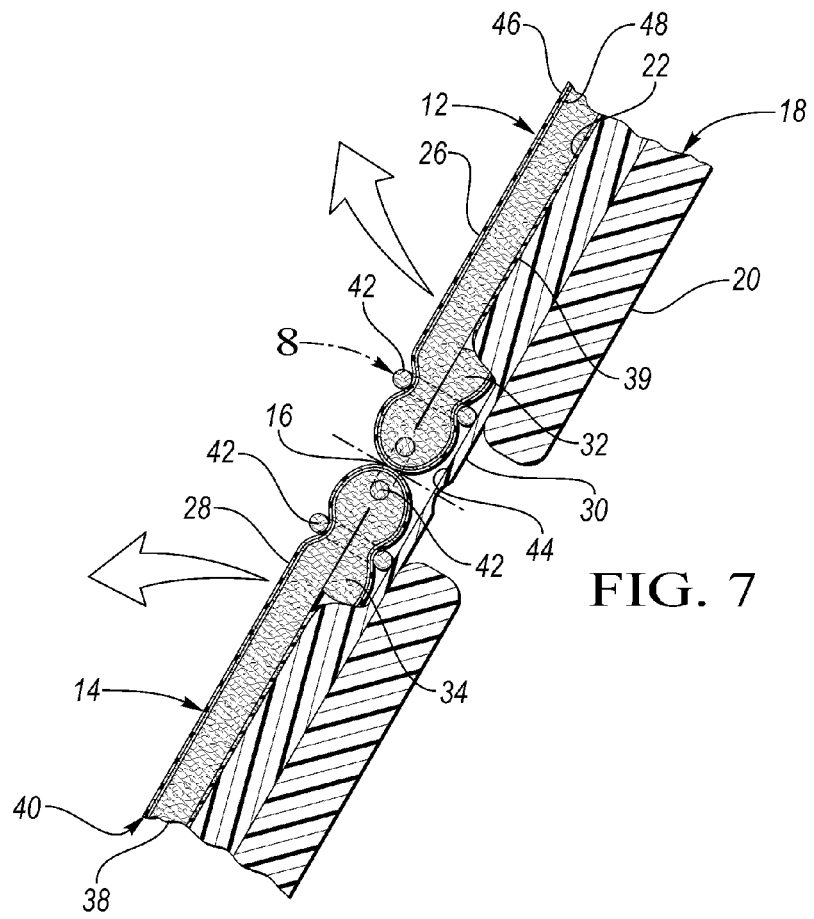
FIG. 7 is a view, partially broken away and in cross section, taken along lines 7-7 of FIG. 6.
Figure 10:
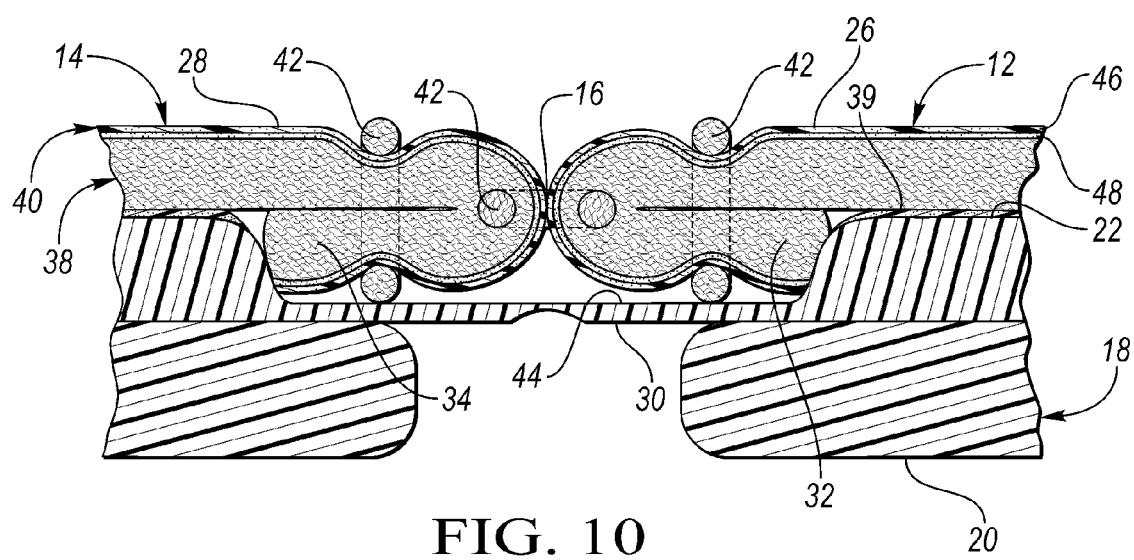
FIG. 10 is a view similar to the view of FIG. 7 but enlarged.

Each of the cover pieces 12 and 14 may have a series of holes penetrating therethrough and wherein the stitches 42 penetrate the holes in a pattern. Each pattern of holes may extend parallel and adjacent to the decorative seam 16. The series of holes may penetrate through the folded-under edges 32 and 34 of the cover pieces 12 and 14, respectively, as shown in FIGS. 7 and 10.

The tear seam 30 may be at least partially formed by a channel 44 in the outer surface 22 of the carrier 18, wherein the folded-under edges 32 and 34 are disposed in and extend across the entire width of the channel 44. The folded-under edges 32 and 34 at the decorative seam 16 form a decorative wrinkle and protect the tear seam 30 because of the tight fit between the edges 32 and 34. The wrinkle may be a straight-line wrinkle.

Each of the resin coatings 40 may include a clear or light-colored resin layer 46 and a pigmented resin layer 48 overlying and protecting its leather layer 38. Each light-colored or clear resin layer 46 overlies and protects its pigmented resin layer 48.

Each of the resin coatings 40 may include at least one anti-fading compound, at least one anti-soiling compound, and at least one water-repellant compound as previously described.

Each of the leather layers 38 may be a natural or genuine leather layer.

Figure 8:
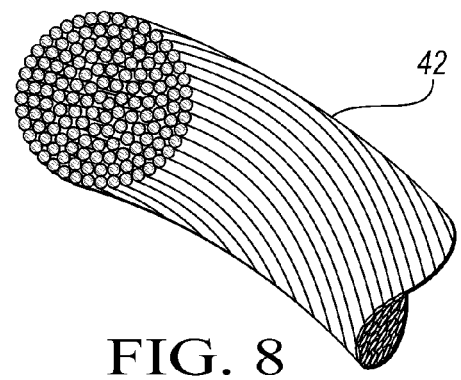
FIG. 8 is a perspective view, partially broken away and in cross section, of an exemplary stitch.
Figure 9:
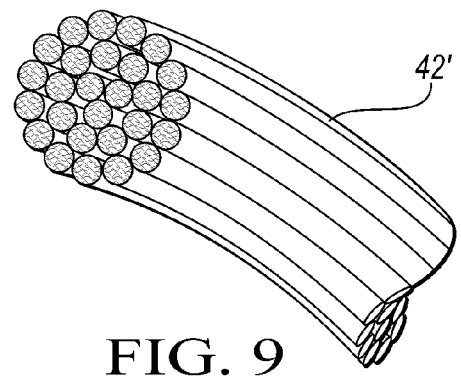
FIG. 9 is a view similar to the view of FIG. 8 but shows a second exemplary stitch.

The stitches 42 and 42' may be thread stitches having a greater or lesser number of multiple strands as shown in FIGS. 8 and 9, respectively.

The airbag cover assembly 10 may be a passenger-side, airbag cover airbag assembly as shown in FIG. 1.

The structural carrier 18 may be molded in two pieces from a thermoplastic elastomeric material such as TPO and then bonded together.

The thermoplastic elastomer of the airbag body or structural carrier 18 is preferably a thermoplastic elastomer such as thermoplastic polyolefin, thermoplastic urethane, polyester, polycarbonate, a mixture of polycarbonate and ABS (acrylonitrile/butadiene/styrene) or similar material. The durometer and elastic or flex modulus of the materials varies depending on the desired stiffness of the component. Typically, the durometer of the airbag carrier 18 will be in the range of about 20 Shore D to 100 Shore D, while the flexural modulus will be in the range of about 15,000 to about 400,000 psi. These ranges of course vary depending on the desired plastic component to be manufactured and are only illustrative of one example.

The assembly 10 further includes first and second sets of hinges (not shown) for hingedly connecting the first and second airbag doors 26 and 28 to the front panel 24 to allow the first and second airbag doors 26 and 28, respectively, to swing open. In some applications a single air bag door will suffice.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag cover assembly including layered, decorative cover pieces held together at a decorative seam, the assembly comprising:
   a two-piece plastic structural carrier, mountable in an automotive instrument panel, having an inner surface, an outer surface and a tear seam;
   a pair of leather cover pieces overlying the outer surface of the carrier to form a covered front panel and at least one covered deployment door configured to enclose a non-inflated airbag, the tear seam forming a substantially weakened area of the carrier adjacent to the at least one door wherein apposed peripheral edges of the cover pieces are folded under and are adjacent to one another to form the decorative seam adjacent to and aligned with the structurally weakened area, each of the cover pieces including a layer of leather bonded to the outer surface of the carrier and a resin coating overlying and protecting the leather layer; and stitches to hold the cover pieces together at the decorative seam, the stitches bursting in a controlled fashion and the structurally weakened area tearing during high-pressure impact during airbag deployment through the weakened area and through the decorative seam at the folded-under edges of the cover pieces.

2. The assembly as claimed in claim 1, wherein the resin coatings of the cover pieces are adjacent to one another to form the decorative seam and protect the peripheral edges of the cover pieces.

3. The assembly as claimed in claim 1, wherein each of the cover pieces has a series of holes penetrating therethrough and wherein the stitches penetrate the holes in a pattern.

4. The assembly as claimed in claim 3, wherein each pattern of holes extends parallel and adjacent to the decorative seam.

5. The assembly as claimed in claim 3, wherein each series of holes penetrate through the folded-under edge of one of the cover pieces.

6. The assembly as claimed in claim 1, wherein the tear seam is at least partially formed by a channel in the outer surface of the carrier, wherein the folded-under edges are disposed in the channel and wherein the folded-under edges at the decorative seam form a decorative wrinkle and protect the tear seam.

7. The assembly as claimed in claim 6, wherein the wrinkle is a straight-line wrinkle.

8. The assembly as claimed in claim 1, wherein each of the resin coatings includes a clear or light-colored resin layer.

9. The assembly as claimed in claim 8, wherein each of the resin coatings includes a pigmented resin layer overlying and protecting its leather layer and wherein each light-colored or clear resin layer overlies and protects its pigmented resin layer.

10. The assembly as claimed in claim 1, wherein each of the resin coatings includes at least one anti-fading compound, at least one anti-soiling compound, and at least one water-repellant compound.

11. The assembly as claimed in claim 1, wherein each of the leather layers is a natural or genuine leather layer.

12. The assembly as claimed in claim 1, wherein the stitches are thread stitches.

13. The assembly as claimed in claim 1, wherein the airbag cover assembly is a passenger-side, airbag cover assembly.

14. The assembly as claimed in claim 1, wherein the structural carrier is molded from a thermoplastic elastomeric material.

15. The assembly as claimed in claim 14, wherein the material is TPO.

16. An airbag cover assembly including layered, decorative cover pieces held together at a decorative seam, the assembly comprising:

a two-piece plastic structural carrier, mounted in an automotive instrument panel, having an inner surface, an outer surface and a tear seam;

a pair of leather cover pieces overlying the outer surface of the carrier to form a covered front panel and a pair of covered deployment doors in close-spaced apposition with one another and configured to enclose a non-inflated airbag, the tear seam forming a substantially weakened area of the carrier adjacent to and between the doors wherein apposed peripheral edges of the cover pieces are folded under and are adjacent to one another to form the decorative seam adjacent to and aligned with the structurally weakened area, each of the cover pieces including a layer of leather bonded to the outer surface of one of the doors and a resin coating overlying and protecting the leather layer; and stitches to hold the cover pieces together at the decorative seam, the stitches bursting in a controlled fashion and the structurally weakened area tearing during high-pressure impact during airbag deployment through the weakened area and through the decorative seam at the folded-under edges of the cover pieces.

17. The assembly as claimed in claim 16, wherein the resin coatings of the cover pieces are adjacent to one another to form the decorative seam and protect the peripheral edges of the cover pieces.

18. The assembly as claimed in claim 16, wherein each of the cover pieces has a series of holes penetrating therethrough and wherein the stitches penetrate the holes in a pattern.

19. The assembly as claimed in claim 18, wherein each pattern of holes extends parallel and adjacent to the decorative seam.

20. The assembly as claimed in claim 18, wherein each series of holes penetrate through the folded-under edge of one of the cover pieces.

21. The assembly as claimed in claim 16, wherein the tear seam is at least partially formed by a channel in the outer surface of the carrier, wherein the folded-under edges are disposed in the channel and wherein the folded-under edges at the decorative seam form a decorative wrinkle and protect the tear seam.

22. The assembly as claimed in claim 21, wherein the wrinkle is a straight-line wrinkle.

23. The assembly as claimed in claim 16, wherein each of the resin coatings includes a clear or light-colored resin layer.

24. The assembly as claimed in claim 23, wherein each of the resin coatings includes a pigmented resin layer overlying and protecting its leather layer and wherein each light-colored or clear resin layer overlies and protects its pigmented resin layer.

25. The assembly as claimed in claim 16, wherein each of the resin coatings includes at least one anti-fading compound, at least one anti-soiling compound, and at least one water-repellant compound.

26. The assembly as claimed in claim 16, wherein each of the leather layers is a natural or genuine leather layer.

27. The assembly as claimed in claim 16, wherein the stitches are thread stitches.

28. The assembly as claimed in claim 16, wherein the airbag cover assembly is a passenger-side, airbag cover assembly.

29. The assembly as claimed in claim 16, wherein the structural carrier is molded from a thermoplastic elastomeric material.

30. The assembly as claimed in claim 29, wherein the material is TPO.

* * * * *